J. H. Jones.
Turbine Wheel.
N°. 97,778. Patented Dec. 14, 1869.
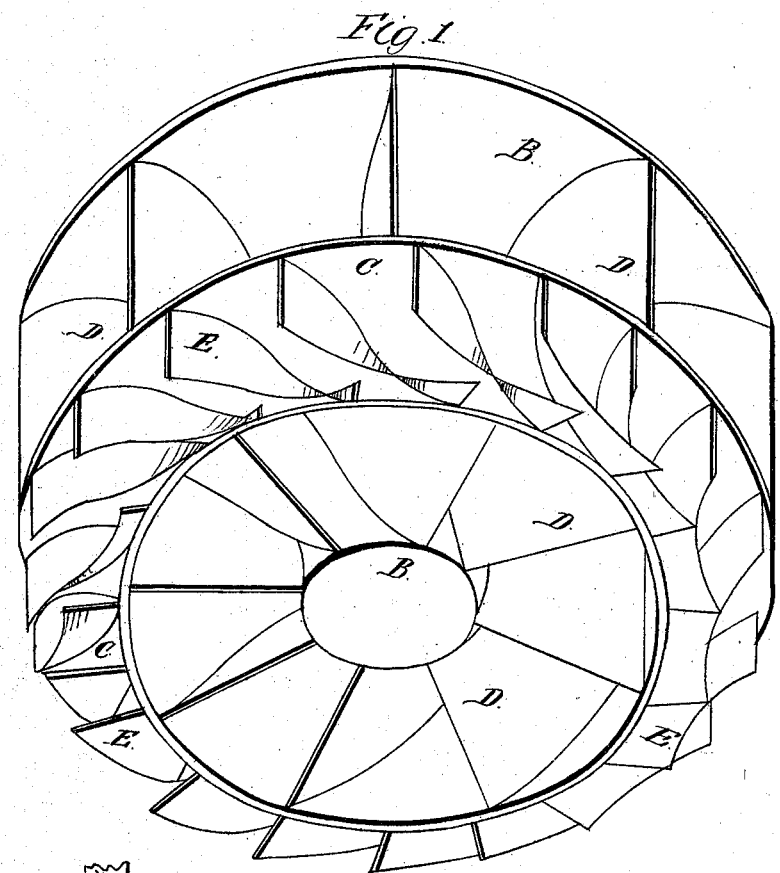
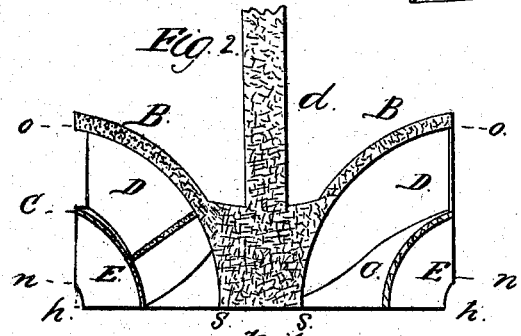
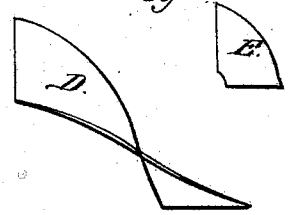

United States Patent Office.

JULIUS H. JONES, OF CHARLTON, MASSACHUSETTS.

Letters Patent No. 97,778, dated December 14, 1869.

IMPROVEMENT IN TURBINE WATER-WHEELS.

The Schedule referred to in these Letters Patent and making part of the same.

I, JULIUS H. JONES, of Charlton, in the county of Worcester, State of Massachusetts, have invented certain Improvements in Water-Wheels, of which the following is a specification.

My invention relates to that class of wheels known as turbines, which receive the water all around the sides or periphery, and discharge it at the bottom; and Its nature consists in arranging two series of buckets, with such form of dividing-rim between them, and such form of wheel or surface confining the water to the upper series as shall give a vertical discharge, said upper buckets being of a twisted spiral form, with the outer end or edge perpendicular, to receive the water, and the lower one horizontal, to give a vertical discharge. The other series, attached below the dividing-rim, are quarter-twist buckets, more in number than the former, and like them in receiving and discharging the water.

In the accompanying drawings—

Figure 1 is a view of my wheel, showing the bottom and one side.

Figure 2 is a vertical central section.

Figure 3 shows the forms of the buckets.

A is the shaft;
B, the body and upper rim;
C, the dividing rim;
D, the upper series of buckets supporting the rim C, they being firmly secured to B;
E, the lower series, attached to the rim C;
$o\ n\ o\ n$, lines showing the water-way; and
$s\ p\ s\ p$, the discharge.

This arrangement enables me to present the greatest surface of bucket for the size of wheel compatible with effective flow of water, and thus to secure the greater power.

I claim the wheel, composed of the two series of buckets, D and E, both having a vertical inlet and horizontal discharge, and the rims B and C, confining the water admitted to the upper series to them, when constructed and operating as above set forth and described.

JULIUS H. JONES.

Witnesses:
A. GREENE,
JAS. G. ARNOLD.